United States Patent

[11] 3,577,784

| | | |
|---|---|---|
| [72] | Inventor | Joseph E. Kovacic<br>Pittsburgh, Pa. |
| [21] | Appl. No. | 787,879 |
| [22] | Filed | Dec. 30, 1968 |
| [45] | Patented | May 4, 1971 |
| [73] | Assignee | Koppers Company, Inc. |

[54] METHOD AND APPARATUS FOR MEASURING COKE OVEN FLUE WALL TEMPERATURES
10 Claims, 4 Drawing Figs.

[52] U.S. Cl. ................................................. 73/355R,
  201/1, 202/151
[51] Int. Cl. ....................................................... G01j 5/08
[50] Field of Search........................................ 73/355,
  351, 343; 136/213, 214; 202/151; 201/1; 356/43

[56] References Cited
UNITED STATES PATENTS

| | | | | |
|---|---|---|---|---|
| 1,125,233 | 1/1915 | Whipple ...................... | 136/214 |
| 2,245,687 | 6/1941 | Krogh........................... | 136/213 |
| 2,275,265 | 3/1942 | Mead ............................ | 73/355 |
| 2,281,847 | 5/1942 | Koppers....................... | 202/151 |
| 3,250,125 | 5/1966 | Bonn............................. | 73/343 |
| 3,345,873 | 10/1967 | Lellep ........................... | 73/351 |
| 3,444,739 | 5/1969 | Treharne..................... | 73/355 |
| 3,010,368 | 11/1961 | Jelinek ......................... | 356/43 |
| 3,506,542 | 4/1970 | Kulakov ...................... | 201/1 |

*Primary Examiner*—Louis R. Prince
*Assistant Examiner*—Denis F. Corr
*Attorneys*—Oscar B. Brumbach, Stanley J. Price, Jr and Olin E. Williams ABSTRACT: A hollow probe having an angularly positioned reflective surface is inserted through an inspection opening in a coke oven battery roof into an "off" flue. The reflective surface is focused on the flue wall at a preselected elevation and reflects the radiant energy emitted by the flue wall along an unobstructed vertical passageway within the probe to a radiation pyrometer positioned externally of the flue where the flue wall temperature is determined and recorded. The probe includes three concentric cylindrical members. Adjacent the lower end portion of the probe there is an opening in the cylindrical members providing a window for the reflective surface. A coolant is circulated between the outer and intermediate cylindrical members and an inert gas is blown through the central passageway to prevent contamination of the reflective surface.

Patented May 4, 1971
3,577,784
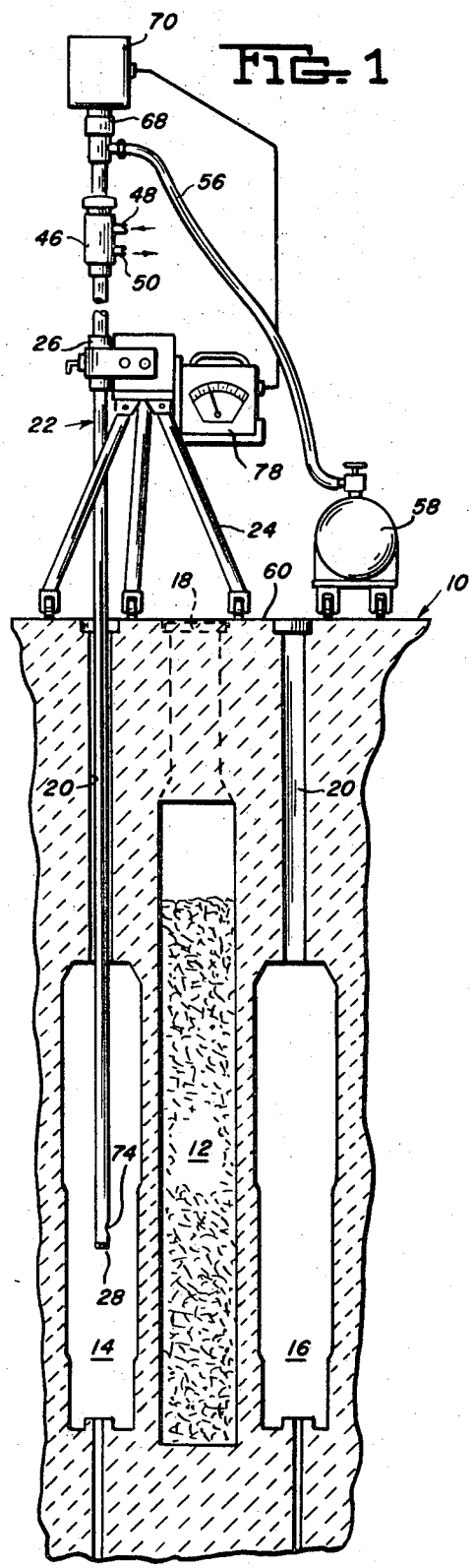
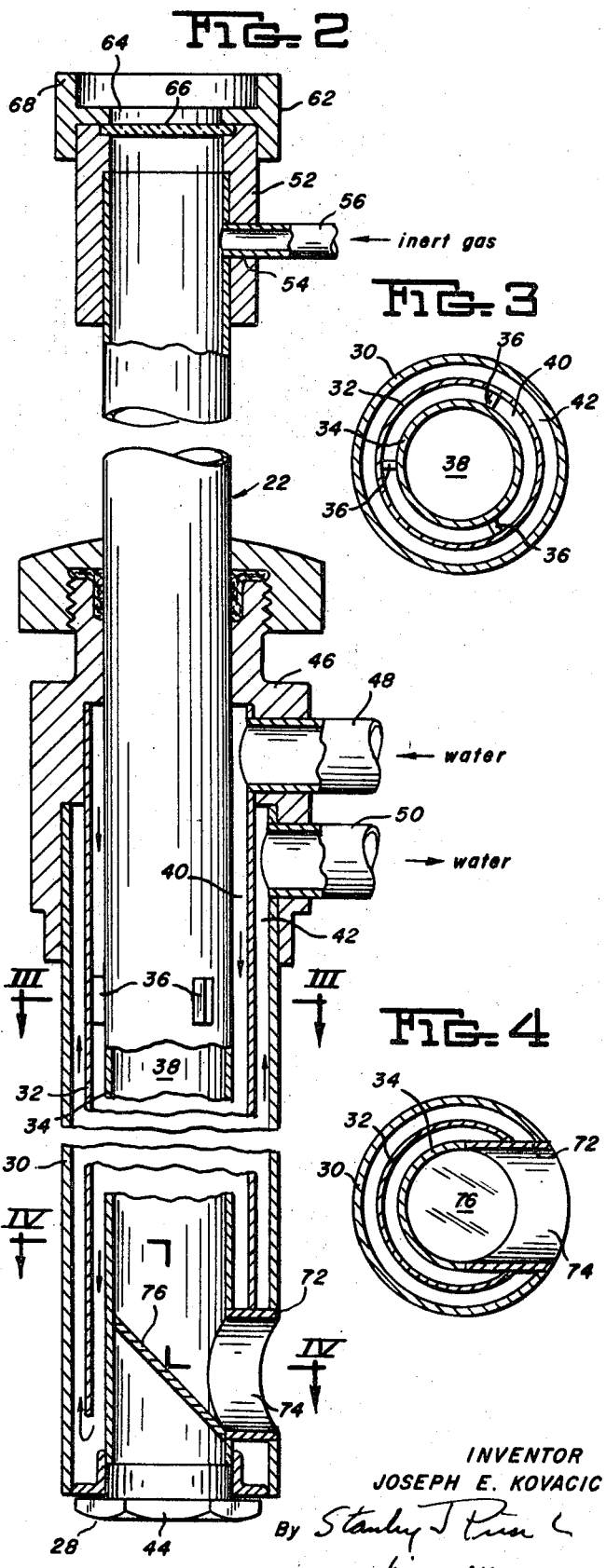
INVENTOR
JOSEPH E. KOVACIC
By Stanley J. Price
his Attorney

METHOD AND APPARATUS FOR MEASURING COKE OVEN FLUE WALL TEMPERATURES

BACKGROUND OF THE INVENTION

1. Field of the Invention

This invention relates to a method and apparatus for measuring the temperature of a coke oven flue wall and more particularly to a method and apparatus for measuring the radiant energy emitted by a flue wall and transmitting this radiant energy by a reflective surface to a radiation pyrometer positioned externally of the coke oven flue.

2. Description of the Prior Art

Presently, the flue temperatures of a coke oven battery are measured by an optical pyrometer that records the temperature at the base of the flue during the "off" cycle and relates these temperatures to a safe operating temperature. This temperature measurement at the base of the flue does not indicate the temperature of the flue wall at various elevations and it is not possible with the present apparatus to obtain a temperature profile of the flue wall nor determine whether a portion of the flue wall exceeds the maximum safe wall temperature.

There have been suggestions in the past of utilizing a thermocouple system where the thermocouples would contact the flue walls at various elevations. Access to the flues is limited to centrally located inspection ports in the battery roof and to contact the flue walls it would be necessary to curve or bend the thermocouple system. The thermocouple system to be operative must be encased in a sheath and no suitable sheath material is available that is flexible enough to follow a curve path or be bent to make contact with the flue walls. There is a need, therefore, for a reliable method and apparatus to measure the flue wall temperatures at various elevations and obtain a temperature profile of the flue wall.

SUMMARY OF THE INVENTION

The present invention comprises a method and apparatus for measuring the temperature of the flue wall at preselected elevations by inserting a cylindrical probe through an inspection opening in the battery roof into the coke oven flue. The probe has a mirror having a reflective surface adjacent one end that is focused on the flue wall at the preselected elevation and reflects the radiant energy emitted by the flue wall upwardly through the probe to a radiation pyrometer positioned outside of the flue. Suitable means are provided to cool the probe while positioned in the flue and other means are provided to maintain the reflective surface free of foreign materials that would interfere with the reflection of the radiant energy from the flue wall to the radiation pyrometer.

BRIEF DESCRIPTION OF THE DRAWINGS

FIG. 1 is a fragmentary view in section and in elevation of a coke oven flue with the temperature probe positioned therein.

FIG. 2 is a view in vertical section of the probe with portions broken away illustrating the window in the side of the probe and the reflective surface positioned therein and the coolant connections.

FIG. 3 is a view in section taken along the line 3-3 in FIG. 2 illustrating the concentric arrangement of the plurality of tubes forming the probe.

FIG. 4 is a view in section taken along the line 4-4 illustrating the window in the sidewall of the probe.

DESCRIPTION OF THE PREFERRED EMBODIMENT

Referring to the drawings and particularly FIG. 1, there is illustrated a coke oven battery generally designated by the numeral 10 with a coking chamber 12 and heating flues 14 and 16 on opposite sides thereof. A coal-charging opening 18 extends through the upper portion of the coke oven battery into the coking chamber 12. Inspection passages 20 open into the respective flues 14 and 16 and provide access to the respective flues from the top of the coke oven battery. There are a series of spaced inspection openings 20 extending longitudinally along each of the flues 14 so that access can be gained to the flues at several different locations along the length of the flue.

A probe generally designated by the numeral 22 is suitably supported on a tripod 24 by means of a supporting sleeve 26. The probe 22 is movable vertically within the sleeve 26 to position the probe lower end portion 28 at various elevations within the flue. Suitable indexing means may be provided on the probe to indicate the elevation of the probe end portion 28 within the flue 14.

Referring to FIGS. 2, 3 and 4, the probes 22 includes concentric tubes 30, 32 and 34. Suitable support spacers 36 maintain in the tubes in concentric relation to each other and provide a main central passageway 38, an intermediate annular passageway 40 and an outer annular passageway 42. A cap member 44 closes the lower end portion 28 and abuts the lower end of the inner tube 34 and provides an end seal between the inner tube 34 and the intermediate tube 32. The intermediate tube 32 terminates above the cap member 44 to thereby connect inner and outer annular passageways 40 and 42 adjacent the probe lower end portion 28.

A sleeve member 46 is secured to the inner tube 34 adjacent the upper end portion and has fluid inlet and outlet conduits 48 and 50 connected thereto. The fluid inlet conduit 48 extends into the intermediate passageway 40 and the fluid outlet conduit 50 extends into the outer passageway 42. With this arrangement a coolant, as for example, water, is circulated downwardly through the intermediate passageway 40 and upwardly through the outer passageway 42 to cool the probe 22 while positioned within the flue 14. The conduit 48 is connected to a suitable source of coolant that is circulated through the concentric passageways 40 and 42 of the probe 22.

A sleeve 52 is secured to the inner tube 34 and has an opening 54 for the flow of a gas, preferably an insert gas such as nitrogen or the like, into the inner passageway 38 of inner tube 34. A conduit 56 is connected at one end to opening 54 in sleeve 52 and at the other end to a container of inert gas under pressure 58 positioned adjacent to the probe 22 on the battery roof 60.

A cap member 62 is positioned on the sleeve 52 adjacent the upper end of inner tube 34 and has a central aperture 64 therein. A disclike quartz window 66 is positioned in the aperture 64 and the sleeve 62 has a suitable annular flange 68 for the sensing head of a radiation pyrometer 70, as is illustrated in FIG. 1.

Adjacent the probe lower end 28 the tubes 30, 32 and 34 have aligned circular apertures therein. A sleeve 72 is positioned in the openings to provide a window 74 in the side of the probe 22 into the central passageway 38. A mirror 76 having a reflective surface is positioned within the passageway 38 at a suitable angle to reflect the radiant energy entering through the window 74 upwardly through the inner passageway 38 and through the quartz window 66 into the sensing head of radiation pyrometer 70. The mirror is suitably secured within the passageway 38 at the predetermined angle, as for example 45°, and may be fabricated from any suitable material having a reflective surface. A conventional glass mirror has been found suitable although metal mirrors with a reflective surface such as chrome metal mirrors may also be used.

The radiation pyrometer 70 may be any suitable pyrometer that will measure the radiation of a surface and translate the radiation to temperature. The preferred pyrometer for use with the probe 22 is a two color or ratio pyrometer manufactured and sold by Milletron, Inc., Irwin, Pennsylvania, such as the pyrometer that is described and illustrated in Milletron Bulletin 031565. It has been found that smoke and dust do not interfere with the temperature measurement by a ratio pyrometer. The temperature measured by pyrometer 70 is recorded on a suitable recording instrument 78 supported from the tripod 24.

The temperature of the flue wall is preferably determined in the "off" flue. However, where desired, the temperature may also be measured in the "on" flue. The probe 22 is inserted through the inspection passageway 20 into the flue 14 and the lower end portion 28 is positioned at a preselected elevation within the flue 14. The probe 22 is adjusted so that the window 74 faces the wall of the flue and the radiant energy emitted by the flue wall is transmitted through the window 74 onto the surface of mirror 76. The radiant energy is reflected by the mirror 76 upwardly through the inner passageway 38 and through the quartz window 66 into the sensing head of radiation pyrometer 70 where the temperature of the wall at the preselected location of the window 74 is determined from the radiant energy emitted by the wall and reflected by the mirror 76.

While the probe 22 is positioned in the flue 14, cooling liquid is circulated through the annular passageways 40 and 42 to prevent distortion of the tubular members 30, 32 and 34 by the elevated temperatures within the flue 14. An inert gas is supplied to the inner passageway 38 and flows downwardly therethrough onto the mirror 76 to maintain the reflective surface of the mirror free from foreign particles that would reduce the reflective properties of the mirror 76. The probe can be moved to any desired elevation within the flue 14 to measure the temperature of the flue wall at various elevations to continuously monitor the temperature of the flue wall during the coking process. The probe end portion may be continuously moved upwardly from the base of the flue to the top of the flue to obtain a temperature profile of the flue wall. With the above described probe it is now possible to accurately measure the flue wall temperature at various elevations within the flue to determine the wall temperature at these locations and to thereby more accurately control the operation of the coke oven and obtain better quality coke.

According to the provisions of the patent statutes, the principle, preferred construction, and mode of operation of this invention have been illustrated and described with what is now considered to represent its best embodiment.

I claim:

1. A method for measuring the temperature of a wall in a coke oven flue comprising:
   inserting an elongated probe through an opening on the battery roof into a coke oven flue,
   positioning a properly oriented reflective surface within the probe to reflect radiation from a wall of said flue at a preselected elevation from the base of the flue, the orientation being such that the reflected radiation travels along the length of the probe,
   focusing said reflected radiation in a radiation pyrometer positioned externally of said flue, and
   determining the temperature of said flue wall at said preselected elevation from the radiant energy emitted by said wall and reflected by said reflective surface to said radiation pyrometer.

2. A method for measuring the temperature of a wall in a coke oven flue as set forth in claim 1 which includes,
   conveying a stream of gas across said reflective surface to maintain said reflective surface substantially free of particulate material.

3. A method for measuring the temperature of a wall in a coke oven flue as set forth in claim 2 which includes,
   cooling said probe while said probe is positioned in said flue.

4. A method for measuring the temperature of a wall in a coke oven flue as set forth in claim 1 which includes,
   reflecting the radiant energy emitted by said flue wall adjacent one end of said probe through an unobstructed enclosed passageway in said probe to the sensing head of a radiation pyrometer adjacent the other end of said probe.

5. A method for measuring the temperature of a wall in a coke oven flue as set forth in claim 1 which includes,
   moving said reflective surface vertically within said flue to obtain a temperature profile of said flue wall.

6. Apparatus for measuring the temperature profile of a wall in a coke oven flue that emits radiant energy comprising:
   an elongated cylindrical probe having a lower end portion and an upper end portion with an axial unobstructed passageway therebetween,
   said probe having an opening in the sidewall adjacent said lower end portion for use in said flue so that said radiant energy can pass through said opening into said probe passageway,
   a mirror having a reflective surface positioned in said probe passageway opposite said opening, said mirror oriented in said passageway to reflect said radiant energy entering through said opening upwardly through said unobstructed passageway, and
   a radiation pyrometer having a sensing head directed toward the mirror in said passageway, said radiation pyrometer sensing head operable to receive and to focus said radiant energy reflected by said mirror through said unobstructed passageway.

7. Apparatus for measuring the temperature profile of a wall in a coke oven flue that emits radiant energy as set forth in claim 6 which includes,
   means to cool said probe while said probe is positioned in a coke oven flue.

8. Apparatus for measuring the temperature profile of a wall in a coke oven flue that emits radiant energy as set forth in claim 6 which includes,
   means to maintain said mirror reflective surface free of particulate material.

9. Apparatus for measuring the temperature profile of a wall in a coke oven flue that emits radiant energy as set forth in claim 6 in which said probe includes,
   a plurality of concentric tubes forming said axial unobstructed passageway, in intermediate annular passageway and an outer annular passageway, and
   means to circulate a cooling fluid through said intermediate and outer annular passageways to cool said probe while positioned in a coke oven flue.

10. Apparatus for measuring the temperature profile of a wall in a coke oven flue that emits radiant energy as set forth in claim 6 which includes:
   a window enclosing said probe end portion,
   a source of gas,
   an inlet opening in the sidewall of said probe adjacent said probe upper end portion,
   means connecting said source of gas to said opening, and
   means to circulate said gas through said inlet opening, downwardly through said unobstructed axial passageway and across the reflective surface of said mirror to maintain said reflective surface free of particulate matter.